US010208228B2

(12) United States Patent
Von Ameln et al.

(10) Patent No.: US 10,208,228 B2
(45) Date of Patent: Feb. 19, 2019

(54) COATING COMPOSITION FOR WOOD FINISHING

(71) Applicant: SHERWIN-WILLIAMS DEUTSCHLAND GMBH, Wuppertal (DE)

(72) Inventors: Frank Von Ameln, Dusseldorf (DE); Gerhard Bitzer, Horb am Neckar (DE)

(73) Assignee: SHERWIN-WILLIAMS DEUTSCHLAND GMBH, Wuppertal (DE)

( * ) Notice: Subject to any disclaimer, the term of this patent is extended or adjusted under 35 U.S.C. 154(b) by 0 days.

(21) Appl. No.: 15/510,334

(22) PCT Filed: Sep. 9, 2015

(86) PCT No.: PCT/EP2015/070564
§ 371 (c)(1),
(2) Date: Mar. 10, 2017

(87) PCT Pub. No.: WO2016/038070
PCT Pub. Date: Mar. 17, 2016

(65) Prior Publication Data
US 2017/0260417 A1    Sep. 14, 2017

(30) Foreign Application Priority Data

Sep. 11, 2014    (EP) .................................. 14184353

(51) Int. Cl.
| | | |
|---|---|---|
| C08F 2/46 | (2006.01) | |
| C08F 2/50 | (2006.01) | |
| C08G 61/04 | (2006.01) | |
| C09D 175/04 | (2006.01) | |
| C08G 18/72 | (2006.01) | |
| C09D 5/00 | (2006.01) | |
| C08G 18/75 | (2006.01) | |
| C08K 5/00 | (2006.01) | |
| C09D 133/08 | (2006.01) | |
| C08G 18/73 | (2006.01) | |
| C09D 5/02 | (2006.01) | |
| C08K 5/07 | (2006.01) | |
| C08K 5/5397 | (2006.01) | |

(52) U.S. Cl.
CPC .......... *C09D 175/04* (2013.01); *C08G 18/722* (2013.01); *C08G 18/73* (2013.01); *C08G 18/755* (2013.01); *C08K 5/0025* (2013.01); *C09D 5/00* (2013.01); *C09D 5/02* (2013.01); *C09D 133/08* (2013.01); *C08K 5/07* (2013.01); *C08K 5/5397* (2013.01)

(58) Field of Classification Search
CPC ...... C09D 175/04; C09D 5/00; C08G 18/755; C08G 18/722; C08G 18/73
USPC ............. 522/18, 12, 7, 6, 189, 184, 1; 520/1
See application file for complete search history.

(56) References Cited

U.S. PATENT DOCUMENTS

| | | | | |
|---|---|---|---|---|
| 2012/0041092 A1* | 2/2012 | Bohannon | ................ | C09D 7/65 522/44 |
| 2015/0191620 A1* | 7/2015 | Beck | ........................ | C09D 4/00 427/559 |

FOREIGN PATENT DOCUMENTS

| | | | |
|---|---|---|---|
| CN | 101633813 A | | 1/2010 |
| CN | 101633813 | * | 6/2013 |

OTHER PUBLICATIONS

Wu et al, CN 101633813 Machine Translation, Jun. 12, 2013 (Year: 2013).*
Wealth Ocean Inc, Runtecure 1265, 2007 (Year: 2007).*
International Search Report and Written Opinion dated Oct. 19, 2015.
International Preliminary Report on Patentability and Written Opinion of the International Searching Authority dated Mar. 23, 2017 issued in Application No. PCT/EP2015/070564.

* cited by examiner

*Primary Examiner* — Jessica Whiteley
(74) *Attorney, Agent, or Firm* — Scully Scott Murphy and Presser

(57) ABSTRACT

The present invention relates to a water-borne UV-curable coating composition for use in wood finishing of interior joinery, furniture, and in particular in kitchen industry.

20 Claims, No Drawings

COATING COMPOSITION FOR WOOD FINISHING

CROSS REFERENCE TO RELATED APPLICATION

The present application is a '371 of PCT Application No. PCT/EP2015/070564, filed on Sep. 9, 2015, which claims priority of EPO Application No. 14184353.2, filed in the EPO on Sep. 11, 2014, the contents of both of which are incorporated by reference.

The present invention relates to a water-borne UV-curable coating composition for use in wood finishing for interior joinery, furniture, or kitchens.

BACKGROUND OF THE INVENTION

Coatings in kitchens and bathrooms must be highly resistant to liquids (both water and oils) and withstand heat and humidity. Conventional aqueous UV coating compositions for use in wood finishing are often processed on a spray painting machine. After conditioning, the coated surface is usually sanded and polished. By the sanding and polishing process, a part of the lacquer is normally removed and the surface is then re-polished to a high gloss finish by using waxes and buffing units. There is some risk that the paint layer gets damaged by the polishing process, especially in the areas of edges and corners, if the coating layer is not thick enough. However, the amount of lacquer which can be applied in one step is normally limited to an amount of 130 g/m$^2$ or less. This is due to the fact that with conventional aqueous UV coating compositions higher amounts or higher thicknesses are often associated with inadequate curing and/or blistering/micro-foam formation resulting from air remaining in the paint layer at high film thicknesses.

In order to have enough paint material on the edges and corners which remains undamaged in the course of the final polishing process and which avoids micro-foam formation at the paint surface, it is thus normally required to apply at least two lacquer layers, each e.g. in an amount of about 100-130 g/m$^2$, which have to be applied in a multi-step process. After application of a first coating layer the surface is usually subjected to a drying phase of about 45 minutes followed by UV curing. Before applying a second layer the surface is normally sanded. Then a second layer is sprayed on top of the first layer, again followed by a drying phase and UV curing. Such a multi-step process is both time-consuming and cost-intensive.

It would be desirable to have a UV coating composition where less process steps are required, i.e. where e.g. one coating step and one sanding operation could be saved. In other words, there is a need for a UV coating composition which allows for an application of a high enough film thickness (coating in an amount of about 180-250 g/m$^2$) in one single coating step, while highly reducing or avoiding inadequate curing and/or micro-foam formation.

SUMMARY OF THE INVENTION

The invention relates to a water-borne UV-curable coating composition for use in wood finishing based on a crosslinking system which comprises
(a) 30 to 70 wt % of a waterborne UV-curable polyurethane dispersion,
(b) 10 to 40 wt % of a waterborne UV-curable acrylate emulsion,
(c) 0.5 to 5.0 wt % of a mixture of defoamers comprising
   (i) 30 to 70 wt % of a silicone-free polymeric defoamer, and
   (ii) 70 to 30 wt % of a polysiloxane emulsion, based on the total weight of the mixture of defoamers,
(d) 1.2 to 5.0 wt % of a mixture of photoinitiators comprising
   (1) 25 to 75 wt % a first photoinitiator selected from the group of acyl-phosphine-oxides, and
   (2) 75 to 25 wt % a second photoinitiator selected from the group of alpha-hydroxy-ketones based on the total weight of the mixture of photoinitiators, and
(e) 0 to 30 wt % of colorant,
wherein the amounts of components (a) to (e) are based on the total weight of the water-borne UV-curable coating composition.

DETAILED DESCRIPTION OF THE INVENTION

The UV-curable polyurethanes used as component (a) are preferably in the form of an aqueous dispersion having a solid content of 30 to 50 wt %, preferably about 40 wt %. Such polyurethane dispersions are commercially available and may be UV-curable polyester/polyurethane dispersions or UV-Curable polyurethane/acrylic copolymer dispersions or mixtures thereof. Such polyurethane dispersions are usually derived from one or more polyisocyanates and one or more hydroxyl terminated intermediates such as polycarbonate intermediates, polyester intermediates, or polyether intermediates, or combinations thereof. Preferably, the UV-curable polyurethanes comprise hydroxyl groups. Suitable polyurethane dispersions that may be utilized include Alberdingk Lux 255 and 260, commercially available from Alberdingk Boley, Bayhydrol UV2689/1XP, commercially available from Bayer Material Science, Neorad R-441 and R-449, commercially available from Neoresins, and Syntholux DRB 1720 W, Syntholux BW1980 and Syntholux BW2102, commercially available from Synthopol. Examples of preferred UV-curable polyurethanes are polyester modified aliphatic polyurethane dispersions (commercially available e.g. as Alberdingk Lux 255 and 260, Neorad R-441 or Syntholux DRB 1720 W) and urethane/acrylic copolymer dispersions (commercially available e.g. as Neorad R-449).

The composition comprises 30 to 70 wt %, preferably 35 to 50 wt %, more preferably about 40 wt % of the water-borne UV-curable PU dispersion (a).

The UV-curable acrylate emulsion (b) are preferably in the form of an aqueous dispersion having a solid content of 40 to 70 wt %, preferably about 55 wt %. The UV-curable acrylate emulsion comprises one or more of the following components; an acryl resin (including methacryl resin) emulsion, an acrylic ester resin (including methacrylic ester resin) emulsion, or an acryl-styrene resin emulsion. Preferably, the UV-curable acrylate comprises hydroxyl groups. Suitable acrylate emulsions that may be utilized include Alberdingk Lux 855 commercially available from Alberdingk Boley and Bayhydrol UV XP2687, commercially available from BAYER Material Science.

The composition comprises 10 to 40 wt %, preferably 15 to 25 wt %, more preferably about 20 wt % of the water-borne UV-curable acrylate emulsion (b).

The water-borne UV-curable coating composition further comprises 0.5 to 5.0 wt % of a defoamer mixture (c) comprising 30 to 70 wt % of a silicone-free polymeric defoamer, and 70 to 30 wt % of a polysiloxane emulsion.

Preferably the water-borne UV-curable coating composition comprises 1.0 to 3.0 wt % of the defoamer mixture (c), more preferably 1.3 to 2.5 wt %.

As regards suitable silicone-free polymeric defoamers, there are no restrictions. Particularly suitable products include those based on natural oils or mineral oils, optionally chemically modified alcohols. Examples of silicone-free polymeric defoamers are defoamers which contain polyethylene glycol and/or polypropylene glycol copolymers. Further examples are aliphatic hydrocarbon/butyl glycol/glycolic acid butyl ester. Silicone-free polymeric defoamer are e.g. available from Byk, Germany, under the trade names BYK®-015, BYK®-016, BYK®-011 or from BASF, Germany, under the trade name FOAMSTAR ST2441. Examples of preferred silicone-free polymeric defoamer are defoamer based on mineral oils (commercially available e.g. as BYK®-011 or FOAMSTAR ST2441).

The polysiloxane emulsion component of the coating composition may comprise a methylpolysiloxane, a dimethylpolysiloxane, a polyethersiloxane or mixtures thereof.

The polysiloxane preferably has a weight average molecular weight in the range of about 1,000-600,000, more preferably in the range of about 10,000-100,000, as determined by gel permeation chromatography (GPC). The polysiloxane preferably has a Brookfield viscosity at 25° C. in the range of about 15,000 cps to about 750,000 cps, more preferably in the range of about 50,000 cps to about 250,000 cps. The polysiloxane preferably has a molecular weight in the range of about 1,000-600,000 and a Brookfield viscosity at 25° C. in the range of about 15,000 cps to about 750,000 cps. More preferably the polysiloxane preferably has a molecular weight in the range of about 10,000-100,000 and a Brookfield viscosity at 25° C. in the range of about 50,000 cps to about 250,000 cps. Polysiloxanes that may be utilized for this purpose include polydimethoxysiloxane which is commercially available for example from Dow Corning, USA or Wacker, Germany.

The polysiloxane emulsion component may preferably contain fine-particle silica which may even be silanized. The content of silica or silanized silica in these known foam inhibitors is normally between 0.5 and 10% by weight and mostly between 1 and 6% by weight. Particularly preferred polysiloxane emulsions are silica-containing dimethyl polysiloxanes. Polysiloxane emulsions containing silica are e.g. available from Dow Corning, USA under the trade names ANTIFOAM 1410, ANTIFOAM 1430.

The polysiloxane emulsion component may also be a polyether silicone copolymer. Such polyether silicone copolymers are e.g. available from the company Evonik, Germany, under the trade names TEGO® Foamex 883, TEGO® Foamex 842, TEGO® Airex 902W, TEGO® Airex 901W or Tego® Airex 904W or from the company Byk, Germany, under the trade name BYK®-093.

The water-borne UV-curable coating composition a photoinitiator mixture (d) which provides for UV curing through radical polymerization with the polyurethane/acrylate dispersion(s). The coating composition comprises photoinitiator mixture (d) in an amount of 1.2 to 5.0 wt %, preferably 1.4 to 3.0 wt %. The photoinitiator mixture (d) comprises 25 to 75 wt % of a first photoinitiator selected from the group of acyl-phosphine-oxides and 25 to 75 wt % of a second photoinitiator selected from the group of alpha-hydroxyketones.

Examples of suitable acyl-phosphine-oxide type photoinitiators are 2,2-dimethyl-propionyldiphenylphosphine oxide, 2,2-dimethyl-heptanoyl-diphenylphosphine oxide, 2,2-dimethyl-octanoyl-diphenylphosphine oxide, 2,2-dimethyl-nonanoyl-diphenylphosphine oxide, methyl 2,2-dimethyl-octanoyl-phenylphosphinate, 2-methyl-2-ethyl-hexanoyl-diphenylphosphine oxide, 1-methyl-1-cyclohexanecarbonyldiphenylphosphine oxide, 2,6-dimethylbenzoyl-diphenylphosphine oxide, 2,6-dimethoxybenzoyl-diphenylphosphine oxide, 2,6-dichlorobenzoyl-diphenylphosphine oxide, methyl 2,6-dimethoxybenzoyl-phenylphosphinate, 2,4,6-trimethylbenzoyldiphenylphosphine oxide, methyl 2,4,6-trimethylbenzoylphenylphosphinate, 2,3,6-trimethylbenzoyl-diphenylphosphine oxide, 2,3,5,6-tetramethylbenzoyl-diphenylphosphine oxide, 2,4,6-trimethoxybenzoyl-diphenylphosphine oxide, 2,4,6-trichlorobenzoyl-diphenylphosphine oxide, 2-chloro-6-methylthio-benzoyl-diphenylphosphine oxide, methyl 2,4,6-trimethylbenzoyl-naphthylphosphinate, 1,3-dimethoxynaphthalene-2-carbonyl-diphenylphosphine oxide, 2,8-dimethoxynaphthalene-1-carbonyl-diphenylphosphine oxide, 2,4,6-trimethylpyridine-3-carbonyl-diphenylphosphine oxide, 2,4-dimethylquinoline-3-carbonyl-diphenylphosphine oxide, 2,4-dimethoxyfuran-3-carbonyl-diphenylphosphine oxide and methyl 2,4-dimethylfuran-3-carbonyl-phenylphosphinate.

Examples of suitable alpha-hydroxy-ketone type photoinitiators are 2-hydroxy-2-methyl-1-phenylpropan-1-one, 1-hydroxycyclohexyl phenyl ketone, 2-hydroxy-1-[4-(2-hydroxyethoxy)phenyl]-2-methyl-propan-1-one.

There are several suitable photoinitiators commercially available from the company BASF, Germany, including Irgacure 184 (1-hydroxy-cyclohexyl-phenyl-ketone), Irgacure 819 (bis(2,4,6-trimethylbenzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure 907 (2-methyl-1[4-(methylthio)phenyl]-2-morpholono-propan-1-one), Darocur MBF (a phenyl glyoxylic acid methyl ester) and Darocur 4265 (a 50/50 mixture of bis(2,4,6-trimethylbenzoyl)-phenylphosphine oxide and 2-hydroxy-2-methyl-1-phenyl-propan-1-one), Lucerin TPO-L (Ethyl (2,4,6-trimethylbenzoyl) phenylphosphinate) or commercially available from the company Lamberti, Italy, including Esacure DP250 (32% aqueous emulsion containing a mixture of 2,4,6-trimethyl-benzoyldiphenylphosphine oxide, alpha-hydroxyketones and -benzophenone derivatives)

Preferred photoinitiators are a 50/50 mixture of bis(2,6-dimethoxybenzoyl)-2,4,4-trimethylpentyl-phosphine oxide and 1-hydroxy-cyclohexyl-phenyl-ketone (e.g. commercially available as Irgacure 1850), a 25/75 mixture of bis(2,6-dimethoxybenzoyl)-2,4,4-trimethylpentyl-phosphine oxide and 2-hydroxy-2-methyl-1-phenyl-propan-1-one (e.g. commercially available as Irgacure 1700) or a 50/50 mixture of bis(2,4,6-trimethylbenzoyl)-phenylphosphine oxide and 2-hydroxy-2-methyl-1-phenyl-propan-1-one (e.g. commercially available as Irgacure 4265)

The coating composition may further comprise a colorant in an amount up to 30 wt % based on the total weight of the composition. The term "colorants" as used in the present application is meant to encompass pigments and dyes, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or nonagglomerated. Example of pigments and/or pigment compositions are carbazole dioxazine crude pigment, monoazo pigment, disazo pigment, naphthol AS pigment, isoindolinone pigment, isoindoline and polycyclic phthalocyanine pigment, quinacridone pigment, perylene pigment, perinone pigment, diketopyrrolo pyrrole pigment, pyranthrone pigment, anthanthrone pigment, dioxazine pigment, diketo pyrrolo pyrrole red pigment, titanium dioxide pigment, iron pigments, zinc sulphide, lithopone pigments, carbon black, bismuth vanadium pigments and mixtures thereof. Preferably, the pigment is titanium dioxide and, most preferably, rutile.

Preferably, the coating composition comprises 2 to 25 wt % pigment, more preferably 5 to 22 wt %, even more preferably 15 to 20 wt %.

In case the coating composition comprises a colorant, dispersing agents are preferably added to help to disperse the colorant in the composition. Dispersing agents, if present, are preferably contained in the coating composition in an amount of 0.5 to 2 wt %, preferably in an amount of 0.75 to 1.5 wt %, more preferably in an amount of 0.8 to 1.0 wt %. Examples of dispersing agents include polyacrylate salts, e.g. sodium, potassium or ammonium salts of polyacrylic acid. The polyacrylic acid preferably has a weight average molecular weight before neutralisation in the range of about 5,000-150,000, as determined using by gel permeation chromatography (GPC). Examples of preferred dispersing agents are e.g. available from the company Coatex, Belgium, under the trade names Coadis® BR and Coadis® 123K; from the company Allnex, Germany, under the trade name Additol®-XW330 or from the company BASF, Germany, under the trade name Hydropalat®-1706.

The coating composition may comprise further additives like thickeners, surface agents, and/or flow control agents.

Thickeners are preferably contained in the coating composition in an amount of 0.1 to 1.0 wt %, preferably in an amount of 0.15 to 0.5 wt %, more preferably in an amount of 0.2 to 0.35 wt %. Examples of thickeners include non-ionic polyurethanes, preferably hydrophobically modified ethoxylated polyurethanes which are e.g. available from the company Manzing, Germany under the trade names Tafigel® PUR40, Pur 60, and Pur 61, from the company BASF, Germany, under the trade names DSX®-1550 and DSX®-3256 or from the company DOW Chemical, USA, under the trade names Acrysol®-RM 2020 and Acrysol®-RM 5000.

Surface agents are preferably contained in the coating composition in an amount of 0.5 to 4.0 wt %, preferably in an amount of 1.0 to 3.0 wt %, more preferably in an amount of 1.5 to 2.5 wt %. Examples of surface agents include silane compounds, like methacryloxy functionalized trimethoxy silane which are e.g. available from the company Momentive, USA, under the trade name Silquest® 174 NT or from the company Wacker, Germany, under the trade names Geniosil® GF31 and GF39 or amino functionalized trimethoxy or triethoxy silane which are e.g. available from the company Momentive, USA, under the trade name Silquest® A 1100 and A 1102 or from the company Wacker, Germany, under the trade names Geniosil® GF93 and GF96.

Flow control agents are preferably contained in the coating composition in an amount of 0.3 to 1.0 wt %, preferably in an amount of 0.5 to 0.8 wt %. Examples of flow control agents include layered silicate which can be a naturally occurring layered silicate, like montmorillonite or bentonite or a synthetic layered silicate such as laponite, which is a synthetic layered hydrous sodium lithium magnesium silicate. Preferably the synthetic layered silicates incorporate an inorganic polyphosphate peptiser. Examples of preferred layered silicates are those which are e.g. available from the company Elementis, USA, under the trade names Bentone® HC and DY CE or from the company Rockwood, USA, under the trade names Laponite® RD and RDS and Optigel® SH and S403. Preferably the flow control agent particles have an average diameter of from 20 to 30 nanometers and an average thickness of from 0.70 to 1.5 nanometers.

The coating composition is preferably composition which comprises lower levels of volatile organic compounds (VOCs), like organic solvents. Examples of organic solvents that might be present are butyldiglycol, 2,2,4-trimethyl-1,3-pentanediol monoisobutyrate) (Texanol®) and butyl glycol. Preferably the coating composition contains less than 3 wt % of VOCs, more preferably less than 1 wt % of VOCs and even more preferably essentially no VOCs, e.g. less than 0.5 wt %, preferably less than 0.2 wt % of VOCs.

The coating composition is preferably mixed with a hardener before being applied to a surface. The hardener preferably contains one or more water-dispersible aliphatic polyisocyanates, more preferably a mixture of water-dispersible aliphatic polyisocyanates, wherein the water-dispersible aliphatic polyisocyanates comprise two or more isocyanate groups, preferably two to four isocyanate groups per molecule. In a more preferred embodiment the hardener is a mixture of hexamethylene diisocyanate (HDI) and isophorone diisocyanate (IPDI) derivatives. The hardener is preferably added to the coating composition in an amount between 5 to 20 wt %, more preferably 8 to 12 wt %, based on the weight of the coating composition (without the hardener).

EXAMPLES

It should be pointed out that percentages, unless stated otherwise, refer to percentage by weight (wt %).

Example 1

A coating composition is prepared by blending the following ingredients:

400 g waterborne UV curable PU dispersion Syntholux DRB 1720-W, commercially available from Synthopol Chemie 200 g of a waterborne UV curable acrylate dispersion Alberdingk 855VP, commercially available from Alberdingk Boley GmbH 200 g titanium dioxide Kronos 2160, commercially available from Kronos International INC.

9 g polyacrylate salt dispersion Coadis BR3, commercially available from Allnex 5 g siloxane emulsion defoamer Tego Airex 902W, commercially available from Evonik 5 g silicone-free polymeric defoamer Byk015, commercially available from Byk 3.2 g non-ionic polyurethane thickener Tafigel PUR 61, commercially available from Münzing 20 g methacryloxy functional trimethoxy silane Silquest 174NT, commercially available from Momentives 8 g synthetic layered silicate incorporating an inorganic polyphosphate peptiser Laponite RDS, commercially available from Rockwood 14 g of a photoinitiator mixture (50/50 mixture of diphenyl (2,4,6-trimethylbenzoyl)phosphine oxide and 2-hydroxy-2-methyl-1-phenylpropan-1-one) Irgacure 4265, commercially available from BASF and 135.8 g water.

Comparative Example 1

A coating composition is prepared by blending the following ingredients:
- 694 g of a waterborne UV curable PU dispersion Syntholux DRB 1720-W, commercially available from Synthopol Chemie
- 200 g titanium dioxide (rutile pigment) Kronos 2160, commercially available from Kronos International INC.
- 9 g polyacrylate salt dispersion Coadis BR3, commercially available from Allnex
- 10 g silicone-free defoamer FoamStar A410, commercially available from BASF
- 2 g non-ionic polyurethane thickener Tafigel PUR 40, commercially available from Manzing
- 20 g butyl glycol,
- 20 g methacryloxy functional trimethoxy silane Silquest 174NT, commercially available from Momentives
- 5 g polyether siloxane copolymer TEGO WET KL 245, commercially available from EVONIK
- 30 g of a photoinitiator mixture of diphenyl(2,4,6-trimethylbenzoyl) phosphine oxide, α-hydroxyketones and benzophenone derivatives Esacure DP250, commercially available from Lamberti and 10 g water.

Example 2

The compositions of Example 1 and Comparative Example 1 are blended with 10 wt % of a hardener formulation (water-dispersible aliphatic polyisocyanate mixture (hexamethylene diisocyanate (HDI)/isophorone diisocyanate (IPDI) derivatives; solid content 65-73 wt %, NCO content 11.2-13.2%, viscosity 100-300 mPa·s) and applied to a wooden surface (melamine faced board) using a spray gun with gravity flow cup and 2.0 nozzle size in an amount of 220 g/m². The processing is carried out at 20° C. and 50-60% relative humidity in a spray booth. Subsequently, the coated layer is dried for 45 minutes at 45° C. in a circulating air dryer and then cured using a commercially available gallium lamp and mercury lamp.

Evaluation was made by visual inspection for micro-foam at the paint surface and an evaluation of finished surface after polishing.

Example 3

The compositions of Example 1 and Comparative Example 1 are blended with 10 wt % of a hardener formulation (water-dispersible aliphatic polyisocyanate mixture (hexamethylene diisocyanate (HDI)/isophorone diisocyanate (IPDI) derivatives; solid content 65-73 wt %, NCO content 11.2-13.2%, viscosity 100-300 mPa·s) are applied to glass plates using a spray gun with gravity flow cup and 2.0 nozzle size in an amount of 220 g/m². The processing is carried out at 20° C. and 50-60% relative humidity in a spray booth. Subsequently, the coated layer is dried for 45 minutes at 45° C. in a circulating air dryer and then cured using a commercially available gallium lamp and mercury lamp.

These coated glass plates were used for determining the surface hardness according to EN ISO 1522-2001 (König pendulum test) with the pendulum device. The hardness of the coating layer was measured immediately after UV curing (hot surface), after cooling for 30 min at 22° C. and after further 3 hours cooling at 22° C. Table 1 shows the results of the König pendulum test for glass plates coated with the compositions of Example 1 and Comparative Example 1.

TABLE 1

| König hardness values | | |
|---|---|---|
| | Example 1 | Comparative Example 1 |
| after UV curing (45° C.) | 22.4 seconds | 16.8 seconds |
| 30 min. cooling (22° C.) | 32.2 seconds | 19.6 seconds |
| 3 hours cooling (22° C.) | 99.4 seconds | 47.6 seconds |

The hardness values demonstrate that the coating layer of Comparative Example 1 remains softer than that of inventive Example 1, even after 3 hours of cooling. This is an indication of insufficient curing.

A further test is used in order to assess the quality of UV curing. The polished coated surfaces are tested for acetone resistance. This is done by visual inspection after exposure of the paint surfaces with a droplet of acetone for 10 seconds.

For the coated paint surfaces of Example 1 micro-foam was not visible whereas the coated paint surfaces of Comparative Example 1 demonstrated micro-foam at the paint surface which shows that air remained in the paint layer at the film thickness/applied amount of 220 m²/g.

On the coated paint surfaces of Example 1 and Comparative Example 1 a cut is made down to the substrate with a knife. Then the section is exposed for 30 seconds with a droplet of acetone. The coating layer of comparative Example 1 was soft and could be removed from the substrate without any problems. This is again an indication of insufficient curing. In contrast, the coating layer of Example 1 remained stable.

The UV coating compositions of the present invention can be used to obtain coated articles which are excellent in appearance in terms of high gloss specific optical depth and brilliance. Furthermore, the high superficial hardness of the cured composition provides for an excellent long-term durability and colour-stability. The UV coating compositions are useful as coating compositions for wood finishing, in particular for coating of interior joinery, furniture, or in the kitchen industry.

The invention claimed is:

1. Water-borne UV-curable coating composition comprising
   (a) 30 to 70 wt % of a waterborne UV-curable polyurethane dispersion,
   (b) 10 to 40 wt % of a waterborne UV-curable acrylate emulsion,
   (c) 0.5 to 5 wt % of a mixture of defoamers comprising
      (i) 30 to 70 wt % of a silicone-free polymeric defoamer, and
      (ii) 70 to 30 wt % of a polysiloxane emulsion, based on the total weight of the defoamer,
   (d) 1.2 to 5 wt % of a mixture of photoinitiators comprising
      (1) 25 to 75 wt % a first photoinitiator selected from the group of acyl-phosphine-oxides, and (2) 75 to 25 wt % a second photoinitiator selected from the group of alpha-hydroxy-ketones
based on the total weight of the mixture of photoinitiators, and
(e) 0 to 30 wt % of colorant,
wherein the amounts of components (a) to (e) are based on the total weight of the water-borne UV-curable coating composition.

2. The water-borne UV-curable coating composition of claim 1, wherein the first photoinitiator is selected from the group consisting of 2,2-dimethyl-propionyldiphenylphosphine oxide, 2,2-dimethyl-heptanoyl-diphenylphosphine oxide, 2,2-dimethyl-octanoyl-diphenylphosphine oxide, 2,2-dimethyl-nonanoyl-diphenylphosphine oxide, methyl 2,2-dimethyl-octanoyl-phenylphosphinate, 2-methyl-2-ethyl-hexanoyl-diphenylphosphine oxide, 1-methyl-1-cyclohexanecarbonyldiphenylphosphine oxide, 2,6-dimethylbenzoyl-diphenylphosphine oxide, 2,6-dimethoxybenzoyl-diphenylphosphine oxide, 2,6-dichlorobenzoyl-diphenylphosphine oxide, methyl ,6-dimethoxybenzoyl-phenylphosphinate, 2,4,6-trimethylbenzoyldiphenylphosphine oxide, methyl 2,4,6-trimethylbenzoylphenylphosphinate, 2,3,6-trirnethylbenzoyl-diphenylphosphine oxide, 2,3,5,6-tetramethylbenzoyl-diphenylphosphine oxide, 2,4,6-trimethoxybenzoyl-diphenylphosphine oxide, 2,4,6-trichlorobenzoyl-diphenylphosphine oxide, 2-chloro-6-methylthio-benzoyl-diphenylphosphine oxide, methyl 2,4,6-trimethylbenzoyl-naphthylphosphinate, 1,3-dimethoxynaphthalene-2-carbonyl-diphenylphosphine oxide, 2,8-dimethoxynaphthalene-1-carbonyl-diphenylphosphine oxide, 2,4,6-trimethylpyridine-3-carbonyl-diphenylphosphine oxide, 2,4-dimethylquinoline-3-carbonyl-diphenylphosphine oxide, 2,4-dimethoxyfuran-3-carbonyl-diphenylphosphine oxide, and methyl 2,4-dimethylfuran-3-carbonyl-phenylphosphinate.

3. The water-borne UV-curable coating composition of claim 1, wherein the first photoinitiator is selected from the group consisting of 2,6-dimethylbenzoyl-diphenylphosphine oxide, 2,6-dimethoxybenzoyl-diphenylphosphine oxide, 2,6-dichlorobenzoyl-diphenylphosphine oxide, methyl 2,6-dimethoxybenzoyl-phenylphosphinate, 2,4,6-trimethylbenzoyldiphenylphosphine oxide, methyl 2,4,6-trimethylbenzoylphenylphosphinate, 2,3,6-trimethylbenzoyl-diphenylphosphine oxide, 2,3,5,6-tetramethylbenzoyl-diphenylphosphine oxide, 2,4,6-trimethoxybenzoyl-diphenylphosphine oxide, and 2,4,6-trichlorobenzoyl-diphenylphosphine oxide.

4. The water-borne UV-curable coating composition of claim 1, wherein the second photoinitiator is selected from the group consisting of 2-hydroxy-2-methyl-1-phenylpropan-1-one, 1-hydroxycyclohexyl phenyl ketone, and 2-hydroxy-1-[4-(2-hydroxyethoxy)phenyl]-2-methyl-propan-1-one.

5. The water-borne UV-curable coating composition of claim 1, wherein the mixture of photoinitiators comprises 45 to 55 wt % of 2,4,6-trimethylbenzoyldiphenylphosphine oxide and 55 to 45 wt % of 2-hydroxy-2-methyl-1-phenyl-propan-1-one, based on the total weight of the mixture of photoinitiators.

6. The water-borne UV-curable coating composition of claim 1, wherein the mixture of photoinitiators is present in an amount of 1.4 to 3.0 wt % based on the total weight of the water-borne UV-curable coating composition.

7. The water-borne UV-curable coating composition of claim 1, comprising 1.0 to 3.0 wt %, of defoamer (c) based on the total weight of the water-borne UV-curable coating composition.

8. The water-borne UV-curable coating composition of claim 1, wherein the polysiloxane emulsion is selected from the group consisting of methylpolysiloxane, dimethylpolysiloxane, polyethersiloxane and mixtures thereof.

9. The water-borne UV-curable coating composition of claim 1, wherein the coating composition (i) is mixed with a hardener before being applied to a surface or (ii) comprises a hardener, wherein the hardener comprises at least one water-dispersible aliphatic polyisocyanates.

10. The water-borne UV-curable coating composition of claim 1, wherein the UV-curable polyurethane of the water-borne UV-curable polyurethane dispersion (a) comprises hydroxyl groups or the UV-curable acrylate of the water-borne UV-curable acrylate emulsion (b) comprises hydroxyl groups, or both the UV-curable polyurethane of the water-borne UV-curable polyurethane dispersion (a) comprises hydroxyl groups and the UV-curable acrylate of the water-borne UV-curable acrylate emulsion (b) comprises hydroxyl groups.

11. The water-borne UV-curable coating composition of claim 1, comprising 15 to 25 wt % colorant, based on the total weight of the water-borne UV-curable coating composition.

12. The water-borne U V-curable coating composition of claim 1, wherein the colorant is selected from the group consisting of titanium dioxide pigment, iron pigments, zinc sulphide pigments, lithopone pigment, carbon black pigments, bismuth vanadium pigments and mixtures thereof.

13. The water-borne UV-curable coating composition of claim 1, comprising
(a) 35 to 50 wt % of the waterborne UV-curable polyurethane dispersion,
(b) 15 to 25 wt % of the waterborne UV-curable acrylate emulsion,
based on the total weight of the water-borne UV-curable coating composition.

14. A method in wood finishing, comprising applying to a wooden surface the water-borne UV-curable coating composition of claim 1.

15. An article of manufacture coated with the water-borne UV-curable coating composition of claim 1.

16. The water-borne UV-curable coating composition according to claim 2, which comprises 50 wt % of 2,4,6-trimethylbenzoyldiphenylphosphine oxide and about 50 wt % of 2-hydroxy-2-methyl-1-phenylpropan-1-one, based on the total weight of the mixture of photoinitiators.

17. The water-borne UV curable coating composition of claim 7 comprising 1.3 to 2.5 wt % of defoamer (c), based on the total weight of the water borne UV-curable coating composition.

18. The water-borne UV-curable coating composition of claim 9 wherein the coating composition comprises a mixture of hexamethylene diisocyanate (HDI) and isophorone diisocyanate (IPDI) derivatives.

19. The method according to claim 14 wherein the coating is applied to interior joinery article, furniture or kitchen industry article.

20. The article according to claim 15 wherein the article is an interior joinery article, furniture or kitchen industry article.

* * * * *